April 27, 1943.  J. L. ELLIS  2,317,897
EXTRUSION DEVICE
Filed May 20, 1941  4 Sheets-Sheet 1

INVENTOR
JOHN L. ELLIS
BY Charles A. Morton
ATTORNEY

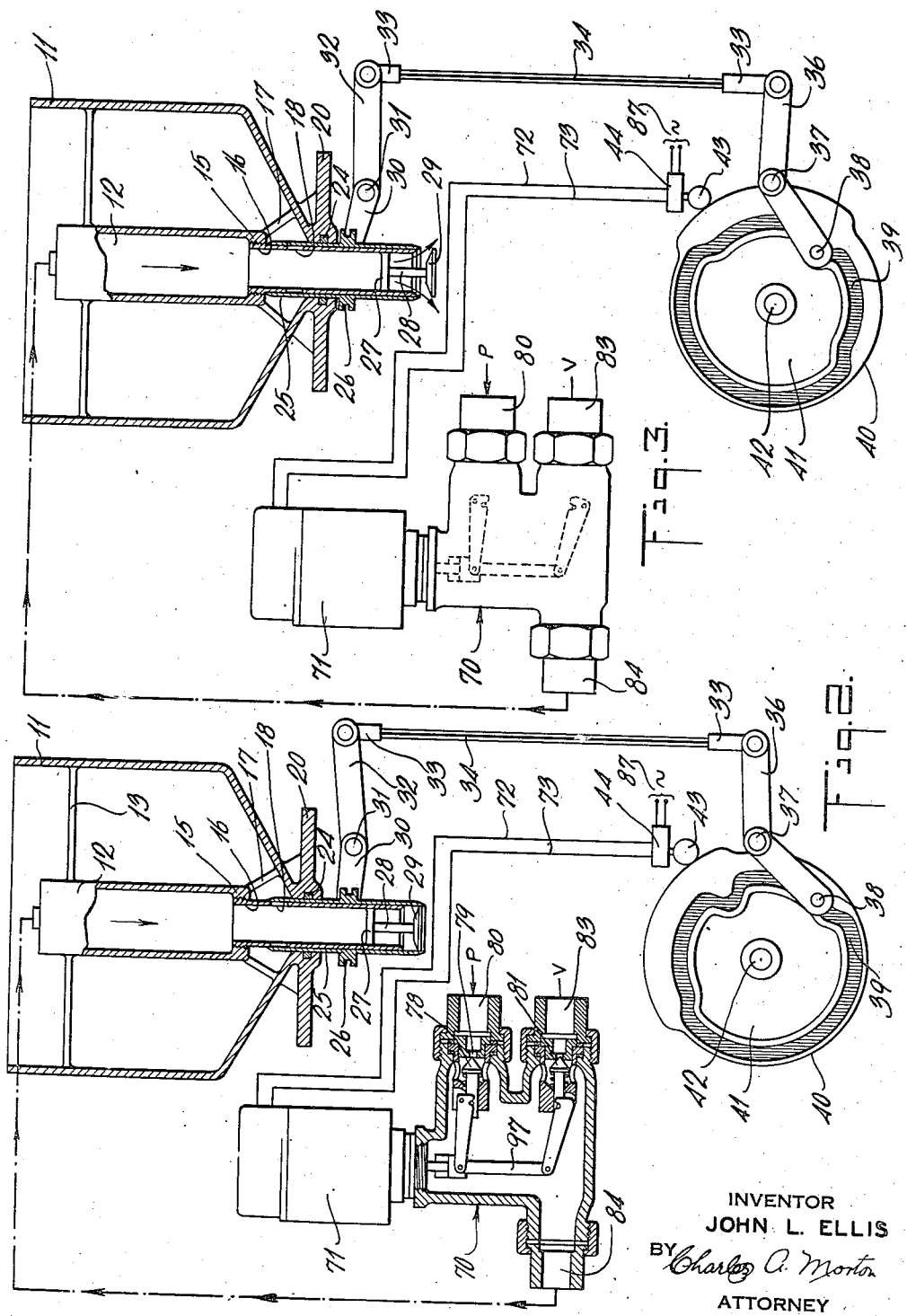

April 27, 1943.                    J. L. ELLIS                    2,317,897
                                EXTRUSION DEVICE
                             Filed May 20, 1941            4 Sheets-Sheet 3
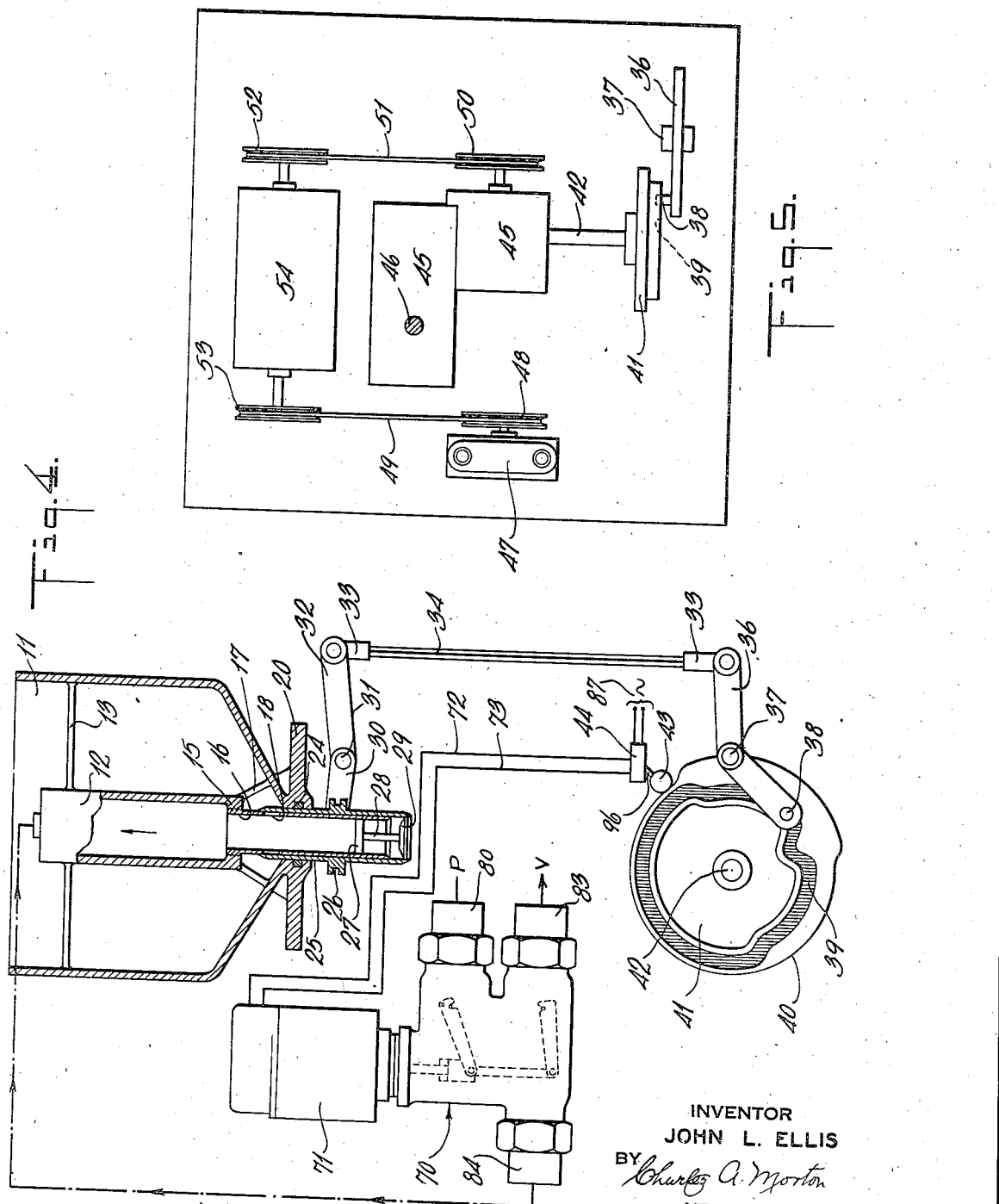
INVENTOR
JOHN L. ELLIS
BY Charles A. Morton
ATTORNEY

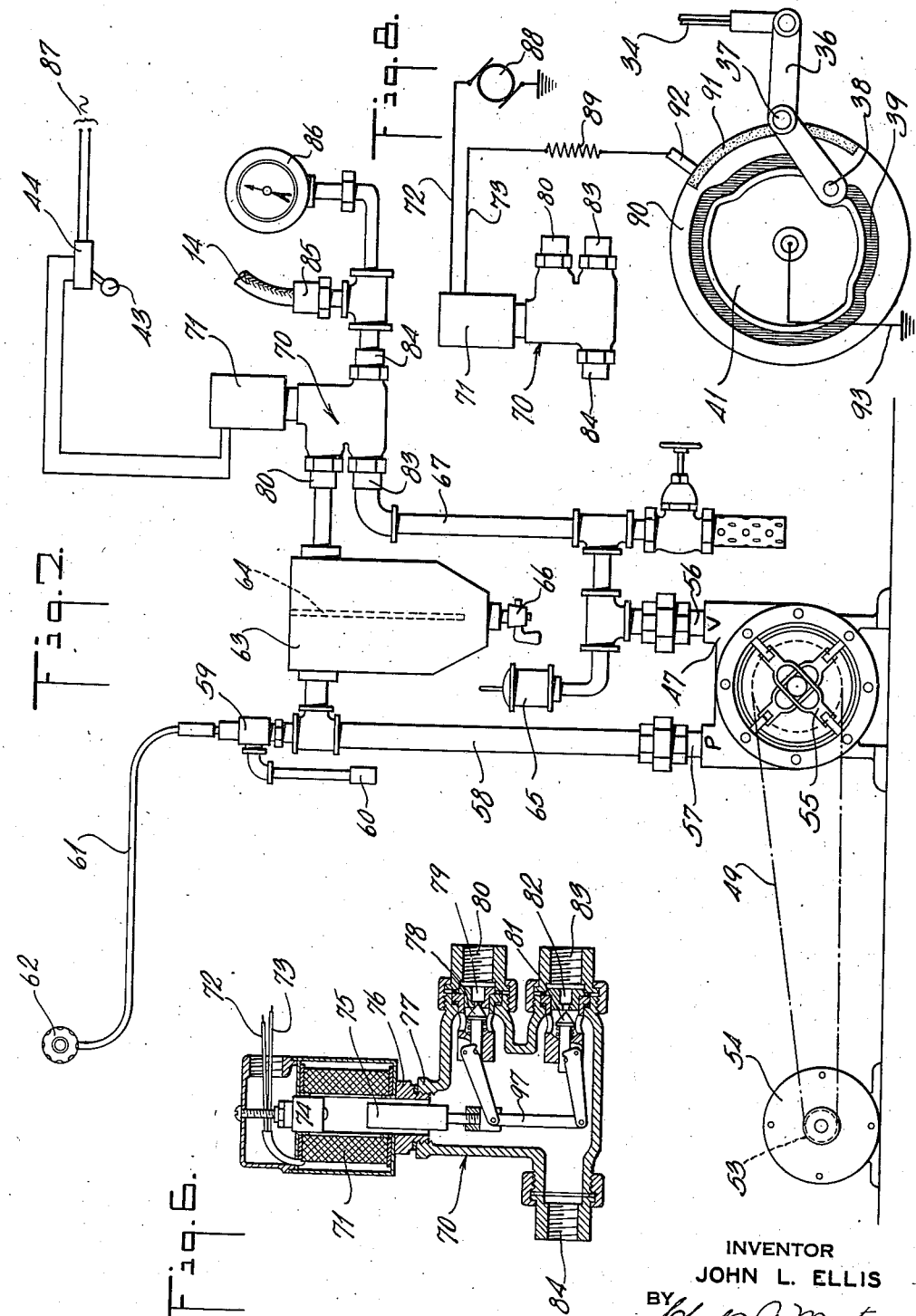

Patented Apr. 27, 1943

2,317,897

UNITED STATES PATENT OFFICE 2,317,897

EXTRUSION DEVICE

John L. Ellis, New York, N. Y., assignor to Joe Lowe Corporation, New York, N. Y., a corporation of Delaware Application May 20, 1941, Serial No. 394,276

6 Claims. (Cl. 107—14)

This invention relates to improvements in extrusion devices, and more particularly to that type of extrusion device wherein the plastic is subjected to changing air pressure rapidly alternating below and above atmosphere to extrude the plastic material. The invention is particularly adapted for use in extruding an edible plastic such as doughnut batter.

Heretofore, extrusion devices of this general character which are known as "vacuum-pressure" cutters have used a dough chamber intermittently connected to and disconnected from a supply hopper by means of a control valve; the dough chamber being alternately connected by a three-way valve to a vacuum pump when the control valve was opened to draw plastic from the hopper into the dough chamber, and then disconnected from the vacuum pump and connected to a pressure pump to build up the pressure in the dough chamber above atmosphere so as to expel the plastic from said chamber and from a forming and cutting die connected therewith, whereby the plastic was extruded from the dough chamber and formed and severed by the die. This arrangement also requires power driven mechanism for controlling the operation of the valves and of the forming and cutting die, in properly timed sequence.

One object of this invention is an extrusion device of the "vacuum-pressure" type wherein the number of moving parts is substantially reduced.

Another object is an extrusion device of the "vacuum-pressure" type which is small, compact, of low capacity, and which is relatively inexpensive to produce.

Another object is an extrusion device wherein the control valve between the hopper and the dough chamber and the forming and cutting die are combined together in one single unit adapted to be quickly attached to and detached from the extrusion device.

Another object of this invention is an extrusion device wherein the hopper and dough chamber are cast in one single piece.

Other objects will appear from the detailed description which follows.

In the drawings comprising four sheets of eight figures numbered Figs. 1 to 8 inclusive certain embodiments of the invention are diagrammatically set forth.

Fig. 1 is a side view with certain of the parts in cross section showing how the extrusion device and its associated control unit are arranged relative to the frying kettle of the doughnut machine;

Figs. 2, 3, and 4 are diagrammatic views of the extrusion device of Fig. 1 showing the position of the essential parts at three different stages of the operating cycle;

Fig. 5 is a plan view of the power and control unit assembly;

Fig. 6 is a vertical cross sectional view of an electro-magnetic three-way control valve;

Fig. 7 is a diagrammatic view of the piping system; and

Fig. 8 is a diagrammatic view of an alternative form of control circuit for the electro-magnetic valve.

Like reference characters designate corresponding parts throughout the several figures of the drawings.

Figure 1:
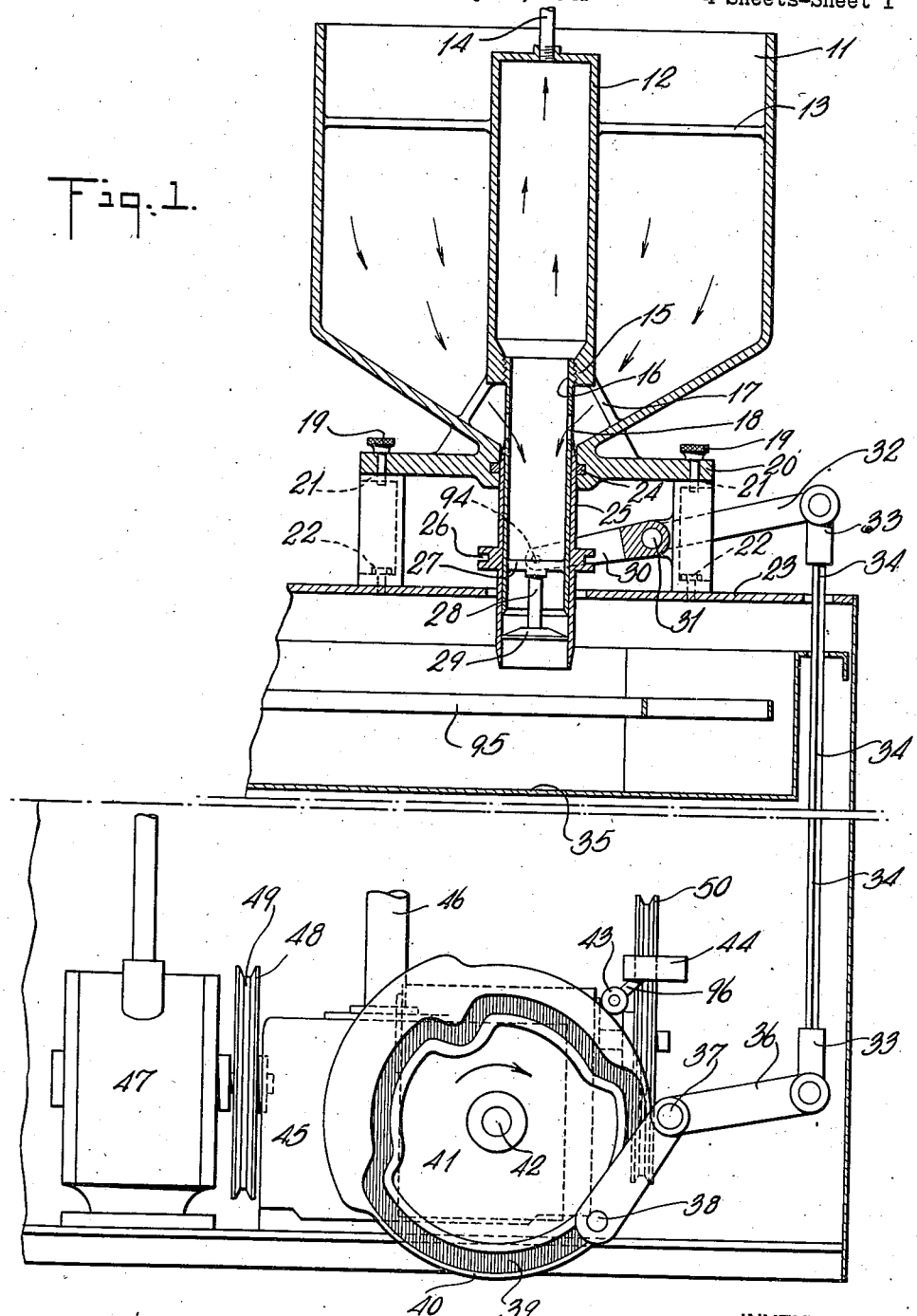

The hopper 11 and vacuum-pressure chamber 12 are cast in one single piece, the chamber 12 being united to the hopper by means of the spiders 13 and 17. The vacuum-pressure chamber is tapped at its upper end to receive a vacuum-pressure pipe 14. The chamber 12 is open at the bottom to form a female threaded throat 15 wherein the male threaded inner sleeve 16 is detachably secured. The inner sleeve 16 extends downwards through and beyond the bottom of the hopper, the sleeve 16 being provided with a series of ports 18—18 opening into the lower end of hopper 11. The hopper is cast with a laterally projecting flange 20, the flange being drilled to accommodate a series of knurled headed bolts 19 which are used to fasten the flange 20 of hopper 11 to a series of supporting brackets 21—21. The brackets 21 are in turn attached to the metal cover 23 of the frying kettle 35 in any suitable manner as by means of the stove bolts 22—22.

The lower end of the inner sleeve 16 is outwardly beveled, and a sleeve cutter 25 is slidably mounted upon the inner sleeve 16 and is movable axially relative to inner sleeve 16. A forming disc or disc cutter 29 is mounted in spaced relation relative to the open lower end of inner sleeve 16 by means of a central stem 28 which is secured in the hub of a spider 27. Sleeve cutter 25 includes an annular channel 26 wherein the pins 94 forming a part of the bifurcated lever arm 30 are inserted to impart axial sliding movement to sleeve cutter 25 under control of lever arm 30. Hopper 11, chamber 12, and flange 20 may be composed of a relatively light, soft metal such as aluminum, while the inner sleeve 16 is preferably made of cast iron while the sleeve cutter 25 is made of steel. One or more sealing rings 24 may be embedded in the central opening of hopper flange 20, to form a guide channel for sleeve cutter 25 thereby preventing leakage of the dough and substantially prolonging the useful life of the soft metal casting of which the flange 20 forms a part. Lever arms 30 and 32 are both mounted upon a shaft 31, lever arm 32 imparting rocking movement to shaft 31 and therefore to bifurcated lever arm 30 by reason of its connection by way of coupling 33 to a connecting rod 34 which passes downwards through the cover 23 of frying kettle 35 to connect by means of a coupling 33 with rocker arm 36 of the power and control unit indicated generally below the broken dot and dash line in Fig. 1.

The power and control unit is best understood by considering Figs. 1, 2, and 5, together. The unit consists essentially of an electric motor 54 driven from a suitable source of electrical energy, motor 54 in turn driving the motor pulleys 52 and 53 which are mounted upon the motor shaft. Pulley 52 is coupled to the grooved pulley 50 of a speed reducer 45 by means of a drive belt 51, thus driving the speed reducer and its associated parts. Motor pulley 53 is geared to a grooved pulley 48 of a vacuum-pressure pump 47 by means of a drive belt 49. The speed reducer 45 is provided with a shaft 42 for driving a disc 41; it also drives the shaft 46 (Fig. 1) which is connected to the rotary conveyor 95 of frying kettle 35.

The disc 41 (Fig. 1) driven by shaft 42 of speed reducer 45 includes a box cam 39 and a peripheral cam 40. A cam follower 38 mounted on one end of rocker arm 36 engages in box cam 39. Similarly roller cam follower 43 follows the contour of peripheral cam 40. Cam follower 38 thus controls the rocking movement of rocker arm 36 about shaft 37 to cause connecting rod 34 to impart rocking movement to lever arms 32 and 30 thus imparting axial sliding movement to sleeve cutter 25 under control of a pair of oppositely disposed pins 94 which engage the annular channel 26 of sleeve cutter 25.

Roller cam follower 43 rocks lever 96 which controls the opening and closing movement of a make and break switch 44 (Fig. 1). Make and break switch 44 controls an electrical circuit including the power leads 87 (Fig. 4) which are connected to a source of electrical energy, and an electrical circuit including the conductors 72 and 73 (Fig. 4), and a solenoid 71. Solenoid 71 controls the operation of the electro-magnetic three-way valve 70 (Figs. 2, 4, 6, 7). Three-way valve 70 (Fig. 6) is connected to solenoid 71 by means of a plunger 75 which rises into the solenoid 71 whenever the energizing circuit for said solenoid is closed by make and break switch 44. Solenoid 71 is secured to three-way valve 70 by means of a male threaded collar 76 which engages the female threaded outlet 77 of three-way valve 70. Three-way valve 70 has a pressure inlet 80 terminating in a valve port 79, a vacuum inlet 83 terminating in valve port 82, and a vacuum-pressure outlet 84. Valve plungers 78 and 81 are mounted upon a rod 97 forming an extension of plunger 75. When solenoid 71 is deenergized solenoid plunger 75 is released and falls by gravity to the position shown in Fig. 6. In this position valve plunger 78 seals valve port 79 thus cutting off communication between pressure inlet 80 and vacuum-pressure outlet 84; while valve plunger 81 unseals valve port 82 thus connecting vacuum inlet 83 and vacuum-pressure outlet 84. When solenoid 71 is energized (Fig. 2), plunger 75 is drawn upwards into the magnetic field of the coil causing valve plunger 81 to seal valve port 82 thus disconnecting valve inlet 83 from vacuum-pressure outlet 84 while valve plunger 78 unseals valve port 79 thus connecting pressure inlet 80 with vacuum-pressure outlet 84. Thus by breaking and making the solenoid circuit vacuum-pressure outlet 84 is alternately connected first to the vacuum inlet 83 and then to the pressure inlet 80, thereby alternately subjecting vacuum-pressure pipe 14 (Figs. 7 and 1) first to a pressure below and then to a pressure above atmosphere.

The pneumatic system is best shown in Fig. 7. The vacuum or input side 56 of pump 47 is connected to a vacuum line 67. A drip oil cup 65 supplies sufficient oil to the pump 47 to lubricate the vanes of pump rotor 55. Hand valve 68 connects an open ended perforated intake 69 with the input side 56 of the pump 47. Intake 69 is both perforated and open at one end to bypass the input side 56 of pump 47 and prevent the vacuum from building up to a point where the plastic material might be drawn through the vacuum line 67 back into the pump 47. Vacuum line 67 is connected to vacuum inlet 83 of three-way valve 70. Pressure pipe 58 includes a pressure regulating valve 59 having an exhaust port 60 and valve 59 is regulated by means of a flexible cable 61 which is connected to pressure regulating knob 62. To prevent oil from pump 47 from passing into vacuum-pressure pipe 14, an oil trap 63 is inserted in pressure pipe line 58 between the delivery side 57 of the pump and pressure inlet 80 of three-way valve 70. Any oil entering oil trap 63 is trapped by baffle plate 64 and falls to the bottom of oil trap 63 where it may be drained off by opening drain cock 66. The degree of vacuum in line 67 may be regulated by hand valve 68, and the degree of pressure in line 58 by regulating knob 62.

When the three-way valve 70 is in the position indicated in Fig. 6, then the vacuum side of pump 47 is connected by way of vacuum inlet 83, vacuum-pressure outlet 84, vacuum-pressure pipe 14, and vacuum-pressure chamber 12. When solenoid 71 is energized rod 97 (Fig. 6) is drawn upwards to the position indicated in Fig. 2 in which position vacuum-pressure chamber 12 is connected to the pressure side of the pump by way of vacuum-pressure pipe 14, vacuum-pressure outlet 84, pressure inlet 80, pressure pipe 58 (Fig. 7), to the delivery side 57 of the pump. The flexible vacuum-pressure pipe 14 is connected to three-way valve 70 by means of hose coupling 85. A compound vacuum-pressure gauge 86 (Fig. 7) indicates all changes of pressure above or below atmosphere in flexible pipe 14.

*Principle of operation*

At the beginning of the operating cycle (Fig. 1) the sleeve cutter 25 has been moved to its downward limit of movement by the rocking action of lever arms 30 and 32 actuated by connecting rod 34, rocker arm 36, and cam follower 38 which at that time occupies the portion of box cam 39 shown in Fig. 1. Roller cam follower 43 is in contact with the curved section of peripheral cam 40, and make and break switch 44 is in open position hence solenoid 71 is deenergized leaving plunger 75 in the position shown in Fig. 6 thus unsealing valve port 82 and connecting the vacuum side of pump 47 to outlet 84, pipe 14 and vacuum-pressure chamber 12.

thus reducing the air pressure in chamber 12 below atmosphere. Due to the difference in pressure, the plastic in hopper 11 is forced downwards through the ports 18 of inner sleeve 16 into the chamber 12 thus charging the chamber with plastic material.

Disc 41 (Fig. 1) now rotates in a clockwise direction until roller cam follower 43 engages the leading edge of the eccentric portion of peripheral cam 40 whereupon make and break switch 44 is closed to complete the energizing circuit for solenoid 71 thereby operating valve 70 and disconnecting the vacuum (or input) side 56 of pump 47, from outlet 84 and pipe 14. Cam follower 38 now enters the eccentric portion of box cam 39 (Fig. 2) to move sleeve cutter 25 upwards far enough to seal the ports 18 of the inner sleeve 16. Solenoid 71 in energizing causes valve plunger 78 to unseal valve ports 79 thus connecting the pressure or delivery side 57 of pump 47 and pressure inlet 80, with outlet 84, pipe 14, and chamber 12, so as to build up the air pressure in chamber 12 above atmosphere.

The continued rotation of disc 41 causes cam follower 38 to enter the V shaped segment of box cam 39 (Fig. 3) thus forcing sleeve cutter 25 upwards so as to uncover the disc cutter 29. The pressure in chamber 12 now exceeds atmosphere thus forcing the plastic in chamber 12 downwards through the throat of inner sleeve 16 and over the forming disc 29. Forming disc 29 may be of any desired shape, but in the drawing a circular disc cutter is illustrated so that the plastic extruded over the disc cutter assumes an annular formation.

By the continued rotation of disc 41, cam follower 38 re-enters the eccentric portion of box cam 39 thus causing sleeve cutter 25 to move downwards over disc cutter 29 to sever the annular formation of plastic material. The eccentric portion of peripheral cam 40 now passes beyond roller cam follower 43 bringing the cam follower into contact with the semi-circular segment of pheripheral cam 40 thus releasing make and break switch 44 and opening the energizing circuit of solenoid 71 thus releasing plunger 75 and cutting off pressure from chamber 12. The continued rotation of disc 41 causes cam follower 38 to engage with the semi-circular portion of box cam 39 thus moving the sleeve cutter 25 downwards to the position shown in Fig. 1, whereupon the ports 18 in inner sleeve 16 are once more uncovered and the cycle of operations is repeated.

The mechanism and circuit for operating and timing the operation of solenoid 71 (shown in Figs. 1 to 4), may be replaced by the circuit shown in Fig. 8. The peripheral cam 40, roller cam follower 43, and make and break switch 44 are replaced in Fig. 8 by the metal interrupter ring 90, which is grounded at 93. One segment 91 of the ring is insulated, to interrupt the circuit of solenoid 71 at brush 92. A suitable resistance 89 may be included in the circuit. Solenoid 71 may be connected to any suitable source of potential as for example grounded generator 88. Interrupter ring 90 is mounted to rotate in unison with disc 41, so as to synchronize the opening and closing of the circuit of solenoid 71 with the operation of the disc 41 containing box cam 39, which controls the operation of sleeve cutter 25.

What is claimed is:

1. In an extrusion machine and in combination, an inner sleeve defining a chamber for housing plastic material, said chamber having an inlet through which plastic may be admitted into, and an outlet through which plastic may be extruded out of, said chamber, a sleeve cutter mounted for axial sliding movement relative to said inner sleeve, said sleeve cutter defining a common valve for controlling the opening and closing of said inlet and said outlet in succession, a pump operable to reduce the pressure in said chamber below atmosphere when the sleeve cutter moves downwards to open the inlet to effect entry of plastic into said chamber and to build up the pressure within said chamber substantially above atmosphere when the sleeve cutter moves upwards first to close the inlet and then to open the outlet to allow plastic to be extruded therefrom, and means for operating the sleeve cutter and the pump in properly timed sequence.

2. In an extrusion machine of the feed hopper type, and in combination, an air chamber associated with the feed hopper, an inner sleeve for housing plastic material removably attachable to said air chamber, said inner sleeve having, an inlet connecting with the feed hopper through which plastic may flow from the feed hopper into the inner sleeve, and an outlet through which the plastic may be extruded from said inner sleeve, a sleeve cutter removably mounted upon said inner sleeve for axial sliding movement relative thereto to form a common valve for controlling the opening and closing of said inlet and said outlet in succession, a three-way valve, a pipe connecting said air chamber to said three-way valve, said valve being operable to effect a reduction of pressure in said air chamber below atmosphere as the sleeve cutter moves to open the inlet to effect entry of plastic into said inner sleeve and an increase of pressure in said air chamber above atmosphere as the sleeve cutter moves to, close the inlet, open the outlet, and sever the plastic extruded through the outlet, and means for operating the sleeve cutter and the three-way valve in properly timed sequence.

3. In an extrusion machine of the feed hopper type, and in combination, an air chamber associated with the feed hopper, an inner sleeve for housing plastic material removably attachable to said air chamber, said inner sleeve having, an inlet connecting with the feed hopper through which plastic may flow from the feed hopper into the inner sleeve, and an outlet through which the plastic may be extruded from said inner sleeve, a sleeve cutter removably mounted upon said inner sleeve for axial sliding movement relative thereto to form a common valve for controlling the opening and closing of said inlet and said outlet in succession, a pump, an air pipe connected to said air chamber, a three-way valve connected to the input and delivery sides of said pump and through said air pipe to said air chamber, said pump under control of said three-way valve being operable to reduce pressure in said air chamber below atmosphere as the sleeve cutter moves to open the inlet to effect entry of plastic into said inner sleeve and to build up the pressure within said air chamber substantially above atmosphere as the sleeve cutter moves to, close the inlet, open the outlet, and sever the plastic extruded through the outlet, and means for operating the sleeve cutter and the three-way valve in properly timed sequence.

4. In an extrusion machine and in combination, an inner sleeve defining a chamber for housing plastic material, said chamber having an inlet through which plastic may be admitted into, and a forming die outlet through which plastic may be extruded out of, said chamber, a sleeve cutter mounted upon said inner sleeve for axial sliding movement relative thereto to form a common valve for controlling the opening and closing of said inlet and of said forming die outlet in succession and to sever the formations of extruded plastic, pump mechanism operable to reduce pressure in said chamber below atmosphere when the sleeve cutter moves downwards to open the inlet to effect entry of plastic into said chamber and to build up the pressure within said chamber substantially above atmosphere when the sleeve cutter moves upwards to first close the inlet and then to open the forming die outlet to allow plastic to be extruded through the outlet and formed by the forming die, and means for operating the sleeve cutter and the pump mechanism in properly timed sequence.

5. In an extrusion machine of the feed hopper type, and in combination, an air chamber associated with said feed hopper, an inner sleeve removably attachable to said air chamber, said inner sleeve having, an inlet port connecting with said hopper through which plastic may be admitted into said inner sleeve, and a forming die outlet by which plastic extruded from said inner sleeve may be formed preparatory to severing, a sleeve cutter removably mounted upon said inner sleeve for axial sliding movement relative thereto to form a common valve for controlling the opening and closing of said inlet port and of said forming die outlet in succession and to sever the formations of extruded plastic, a three-way valve, a pipe line interconnecting said air chamber and said three-way valve, said sleeve cutter and three-way valve being cyclically operable, to effect a reduction of pressure in said air chamber below atmosphere and to open the inlet port, and to effect an increase of pressure in said air chamber above atmosphere and to close the inlet port, open the outlet, and sever formations of extruded plastic, and means for operating the sleeve cutter and the three-way valve in cyclic order.

6. In an extrusion machine of the feed hopper type, and in combination, an air chamber associated with said feed hopper, an inner sleeve removably attachable to said air chamber, said inner sleeve having, an inlet port connecting with said hopper through which plastic may be admitted into said inner sleeve, and a forming die outlet by which plastic extruded from said inner sleeve may be formed preparatory to severing, a sleeve cutter removably mounted upon said inner sleeve for axial sliding movement relative thereto to form a common valve for controlling the opening and closing of said inlet port and of said forming die outlet in succession and to sever the formations of extruded plastic, a pump, a pipe line having one end connected to said air chamber, a three-way valve connected to the input and delivery sides of said pump and through said pipe line to said air chamber, said pump under control of said three-way valve being operable to reduce pressure in said air chamber below atmosphere when the sleeve cutter moves downwards to open the inlet port to effect entry of plastic into said inner sleeve and to build up the pressure within said air chamber substantially above atmosphere as the sleeve cutter moves up and down to, close the inlet port, open the forming die, and sever the plastic extruded through the outlet and formed by the forming die, and means for operating the sleeve cutter and the three-way valve in properly timed sequence.

JOHN L. ELLIS.